United States Patent [19]
Georgiades et al.

[11] Patent Number: 5,866,896
[45] Date of Patent: Feb. 2, 1999

[54] OPTO-ELECTRONIC DEVICE FOR FREQUENCY STANDARD GENERATION AND TERAHERTZ-RANGE OPTICAL DEMODULATION BASED ON QUANTUM INTERFERENCE

[75] Inventors: Nikos P. Georgiades, Pasadena, Calif.; Eugene S. Polzik, Højbjerg, Denmark; H. Jeff Kimble, LaCanada, Calif.

[73] Assignee: California Institute of Technology, Pasadena, Calif.

[21] Appl. No.: 799,169

[22] Filed: Feb. 14, 1997

Related U.S. Application Data

[60] Provisional application No. 60/011,843, Feb. 16, 1996.
[51] Int. Cl.$^6$ .................................................... H01S 3/10
[52] U.S. Cl. .......................... 250/201.1; 372/32; 356/349
[58] Field of Search ........................... 250/201.1; 372/32, 372/21, 22; 356/349

[56] References Cited

U.S. PATENT DOCUMENTS

5,438,578  8/1995  Lee et al. .............................. 250/201.1

*Primary Examiner*—Edward P. Westin
*Assistant Examiner*—Kevin Pyo
*Attorney, Agent, or Firm*—Fish & Richardson P.C.

[57] ABSTRACT

An opto-electronic system and technique for comparing laser frequencies with large frequency separations, establishing new frequency standards, and achieving phase-sensitive detection at ultra high frequencies. Light responsive materials with multiple energy levels suitable for multi-photon excitation are preferably used for nonlinear mixing via quantum interference of different excitation paths affecting a common energy level. Demodulation of a carrier with a demodulation frequency up to 100's THZ can be achieved for frequency comparison and phase-sensitive detection. A large number of materials can be used to cover a wide spectral range including the ultra violet, visible and near infrared regions. In particular, absolute frequency measurement in a spectrum from 1.25 $\mu$m to 1.66 $\mu$m for fiber optics can be accomplished with a nearly continuous frequency coverage.

32 Claims, 6 Drawing Sheets

OPTO-ELECTRONIC DEVICE FOR FREQUENCY STANDARD GENERATION AND TERAHERTZ-RANGE OPTICAL DEMODULATION BASED ON QUANTUM INTERFERENCE

ORIGIN OF THE INVENTION

The U.S. Government has certain rights in this invention pursuant to Grant No. DE-FG03-94ER14473 awarded by the Division of Chemical Science, Office of Basic Energy Science, Office of Energy Research, Department of Energy.

RELATED APPLICATION

This application claims the benefit of the U.S. Provisional Application No. 60/011,843, filed on Feb. 16, 1996, the entirety of which is incorporated herewith by reference.

FIELD OF THE INVENTION

The present invention relates to establishing frequency standards in the ultraviolet, visible and near-infrared regions of the electromagnetic spectrum, and more specifically to a method and system using nonlinear mixing, resulting from quantum interference in multi-photon excitation, for comparing laser frequencies and establishing new frequency standards.

BACKGROUND AND SUMMARY OF THE INVENTION

Optical fibers have been widely used in communication systems to achieve high data capacity that is difficult to obtain in the radio frequency (rf) and microwave spectrum. For commonly used silica fibers, the available bandwidth extends to about 60 THz from 1.25 μm to 1.66 μm, of which approximately 30 THz are actually useful due to water absorption lines around 1.4 μm. Demand for high bandwidth is generated, at least in part, by the recent advent in information technology for applications involving graphic, audio, and video files, and by the rapid increase in information exchange via the Internet and other electronic information channels.

High data capacity in optical links requires efficient and optimized use of available bandwidth in silica fibers. One way to increase the data capacity of a system is signal multiplexing. Multiple signals can be combined into a single channel, for example, by time-division multiplexing and frequency-division multiplexing. To further increase the capacity of an existing optical fiber link, wavelength-division multiplexing is used to multiplex different channels so that all channels can be simultaneously transmitted in the same fiber on optical carriers of different wavelengths.

Frequency division multiplexing and wavelength division multiplexing require precise and reliable frequency measurements to divide the available bandwidth of a fiber link into small bands for different carriers without crosstalk. Thus, well-determined carrier frequencies are desirable. In analogy with FM-radio broadcasting where the FCC assigns a well specified transmission frequency for each station, an overcrowded optical communications network will require accurate carrier specification. Failure to satisfy this requirement will both inhibit the performance and reduce the bandwidth capabilities of a fiber optics network.

An optical frequency standard usually is a stabilized reference laser with a frequency (or wavelength) whose absolute value is known. Other laser frequencies are measured and compared against this frequency standard. A laser can be stabilized at a pre-assigned frequency relative to a frequency standard by controlling the laser via feedback based on an error signal generated by frequency comparison. Laser stabilization is a well-established technology in the art. Once a second laser is stabilized relative to the frequency standard, the second laser becomes a frequency standard itself since its frequency and phase are locked and stabilized with respect to the original frequency standard.

Figure 1:
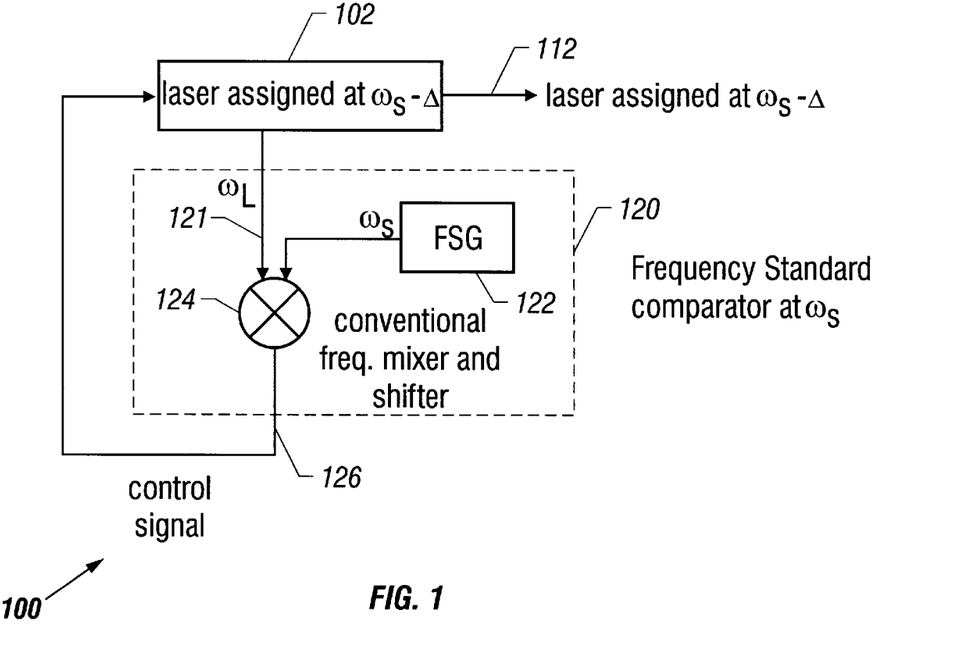
FIG. 1 is a block diagram illustrating a generic optical frequency metrological system.

FIG. 1 illustrates a block diagram for a generic optical frequency metrological system 100. A laser 110 is assigned a frequency $\omega_L$ that is separated from a frequency standard $\omega_S$ by a frequency separation $\alpha$ (e.g., $\omega_L = \omega_S - \Delta$). A portion of the output of laser 110 is fed to an optical communication frequency standard comparator 120. A frequency standard generator (FSG) 122 produces a signal at $\omega_S$. A frequency mixer 124 receives both signals $\omega_L$ and $\omega_S$ and generates an error signal 126. The laser frequency $\omega_L$ is corrected by feeding the error signal 126 back to the laser 110, thus producing an output at the desired frequency ($\omega_S - \Delta$)

In principle, a single frequency standard should suffice since any other frequencies can be measured relative thereto. This requires that optical signal mixers and detection systems be sensitive to a frequency difference $\Delta$ between the frequency standard and the laser frequency. To cover the entire low ultra-violet to near infrared spectrum, the typical range required for $\Delta$ is about 10 THz–1000 THz. For example, the frequency separation $\Delta$ is about 250 THz for stabilizing a laser in the optic communications bandwidth at 1.55 μm relative to the current optical frequency standards (e.g., in the 500–800 nm range). However, many conventional state-of-art techniques are only capable of bridging frequency differences up to about 0.3 to 0.5 THz. Fundamentals of Photonics, Ch. 18 by Saleh and Teich (1991), Wiley Series in Pure and Applied Optics, ed. J. W. Goodman.

One approach to standardizing frequencies is to use a frequency chain of multiple laser frequencies distributed over the frequency range to be bridged. The frequency distances between two adjacent lasers in this frequency chain are chosen to be small enough (e.g., less than about 0.5 THz) so that they can be measured by conventional techniques. Then by stabilizing each laser with respect to adjacent ones, the first laser at one end of the chain can be stabilized with respect to the last laser at the other end of the chain, thus establishing a bridge over a large frequency distance therebetween that otherwise cannot be measured directly by conventional techniques.

A number of existing prior-art techniques use multiple stages of conventional nonlinear wave mixing in nonlinear crystals and through electrooptic modulation to generate the frequency chains for bridging large frequency gaps and to establish additional frequency standards. For example, Telle et al. disclose a nonlinear mixing scheme in Optics Letters, Vol. 15, pp. 532, 1990; Lee and Wong describe another nonlinear mixing method in Optics Letters, Vol. 17, pp. 13, 1992.

Van Baak and Hollberg have published a number of frequency standards using conventional nonlinear mixing techniques in "Proposed sum-and-difference method for optical-frequency measurement in the near infrared", Optics Letters, Vol. 19, No. 19, pp. 1586–1588, 1994, the entirety of which is incorporated herewith by reference.

However, the spectral coverage of the frequency standards using conventional techniques is limited. For example, the established frequency standards published by Van Baak and Hollberg are mainly from 500 nm to about 800 nm, and not in the range from 1.25 µm to 1.66 µm, a region that is critical to fiber optic communications.

Lack of frequency standards in the fiber optic wavelength range from 1.25 µm to 1.66 µm has been well recognized by the industry. This lack of standards can be a limiting factor in the future and can lead to under-utilization of the available bandwidth from optical fibers. The status of optical frequency standards for optical communications and other related industrial sectors was reviewed by Knight in "Laser Frequency Standards in the Near Infrared, Coinciding with the Optical Fiber Transmission Bands", Laser Physics, Vol. 4, No. 2, pp. 345–348, 1994, and by Pollitt, "Standards to Support Light Communications", IEEE Transactions on Instrumentation and Measurement, Vol. 44, No. 2, pp.454–45, 1995. The disclosure of these two articles is incorporated herein by reference.

Conventional nonlinear mixing techniques are also limited in demodulation frequency range (e.g., less than 0.5 THz). This reduces system stability and accuracy of measurements. In addition, the limited number of existing frequency standards requires use of multiple stages of conventional nonlinear wave mixing to generate new frequency standards. This often leads to very complex cascaded nonlinear wave mixing and system performance becomes problematic due to low efficiency of many nonlinear processes and limited power available from lasers.

It has been concluded that frequency standards in 1.3 µm–1.5 µm range are needed for technical advances, commercial purposes, and regulatory requirements. Specifically, two frequency standards in each of the 1.3 µm and 1.5 µm bands (separated by unusable water absorption lines near 1.4 µm) are in immediate need with an accuracy at about 1 part in $10^{-9}$.

In addition, metrology standard proliferation would be aided by additional frequency standards in a spectral range that has been covered by current frequency standards in order to increase implementation flexibility/optimization and resource utilization.

In recognition of the above, the inventors have discovered that quantum interference in multi-photon excitation can be used as a basis for a novel frequency metrological system. In accordance with the present invention, quantum interference in multi-photon excitation by multiple radiation fields at different frequencies is used to lock a laser relative to a reference frequency based on one or more known frequency standards, thereby producing a new frequency standard.

One aspect of the invention is a frequency standard generator based on quantum interference in multi-photon process. A preferred embodiment includes an absorbing medium preferably with three pre-determined excitation levels to facilitate a desired two-photon excitation process, at least one known frequency standard, and a frequency-shifting-and-mixing device. A target laser, which is to be established as a new frequency standard, operates in combination with the known frequency standard and a device for frequency mixing and/or frequency shifting to produce three excitation frequencies each corresponding to three different transitions in pre-determined excitation levels. A signal indicative of quantum interference of two different excitation paths affecting a common energy level is preferably used to control the target laser, thereby maintaining the laser frequency at a predetermined spacing relative to the known frequency standard.

Another aspect of the invention is optical demodulation of a carrier signal with a demodulation frequency range several magnitudes larger than what is obtainable in many conventional systems. For example, the two-photon transition sequence $6S_{1/2} \rightarrow 6P_{3/2} \rightarrow 6D_{5/2}$ in cesium can be used with the preferred embodiment to generate demodulation at 12.5 THz. Other two-photon transitions in cesium or atomic and molecular species can be used in accordance with the present invention to achieve optical demodulation in a range from 10's THz to 100's THz. For example, considering two-photon processes in alkalis elements (e.g., Li, Na, K, Rb and Cs), the inventors discovered demodulation possibilities that extend to about 240 THz.

Still another aspect of the invention is a method for selecting a number of atomic and molecular species as the absorbing medium, thereby making it easier to achieve a wide range of new frequency standards based on a limited number of known frequency standards. In particular, a plurality of new frequency standards can be generated to cover a spectral range from 0.2 µm to 2.0 µm including the 1.25 µm–1.66 µm spectral range for fiber optics. A computerized optimization selection process can be implemented to choose a suitable absorbing medium with desired energy levels.

BRIEF DESCRIPTION OF THE DRAWINGS

These and other advantages of the present invention will become more apparent in light of the following detailed description of the preferred embodiment thereof, as illustrated in the accompanying drawings.

DESCRIPTION OF THE PREFERRED EMBODIMENT

An absorbing medium with three energy levels suitable for two-photon excitation will be referenced hereinafter in describing the preferred embodiment of the invention. It should be understood that this particularity does not present a limitation to the invention, but rather serves as an example to illustrate many features of the present invention and to simplify the description. The systems and techniques disclosed herein can be used with a medium with more than three levels of multi-photon excitation.

Some aspects of the present invention have been disclosed by the inventors in "Frequency Metrology via Quantum Interference in Two-Photon Excitation", Optics Letters, Vol. 21, pp. 1688, Oct. 15, 1996, the entirety of which is incorporated herein by reference.

Figure 2:
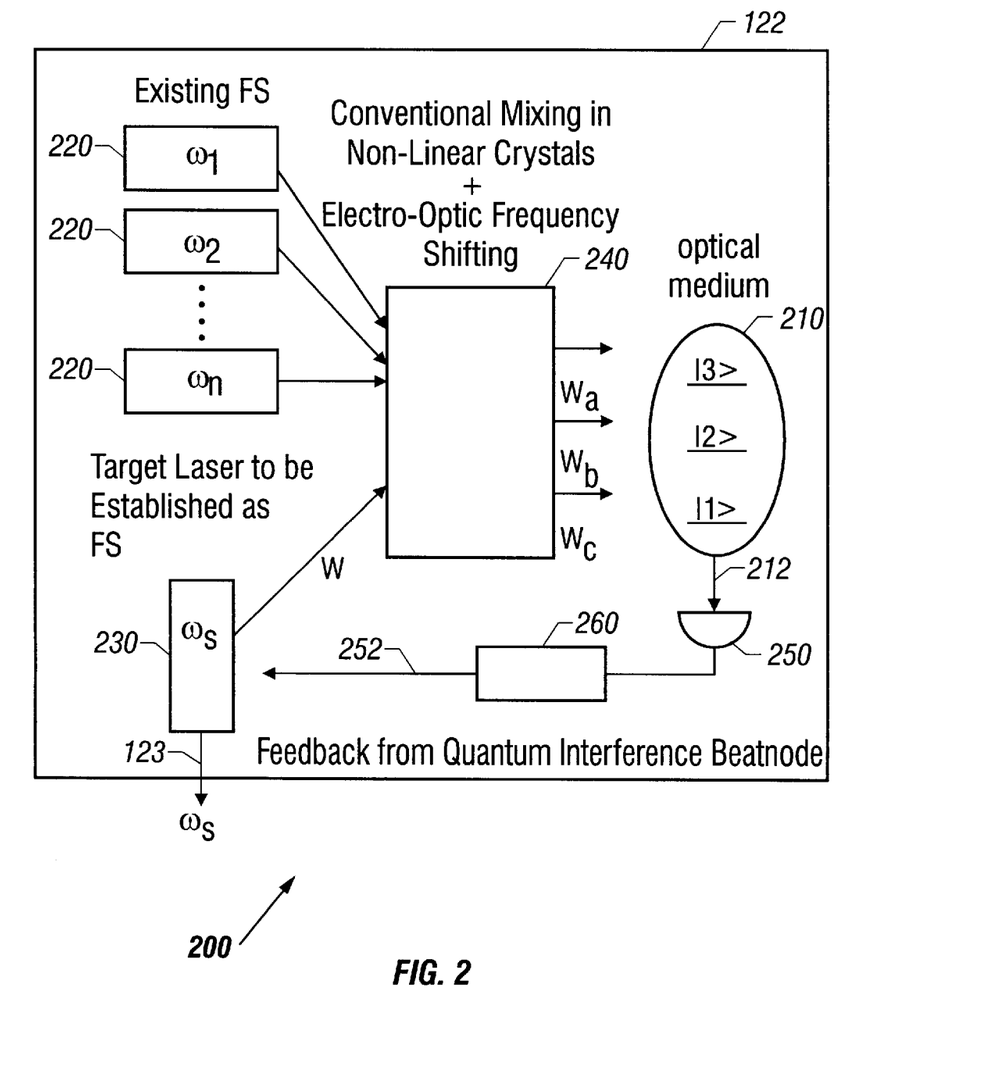
FIG. 2 is a block diagram showing a preferred embodiment for a frequency standard generator in accordance with the present invention.

FIG. 2 shows a preferred frequency standard generator 200 that can be used to function as the frequency standard generator 122 in the optical frequency metrological system 100 of FIG. 1. An absorbing medium 210 with at least three pre-determined energy levels suitable for multiphoton excitation is used as a nonlinear optical signal mixer. An example of three energy levels $|1\rangle$, $|2\rangle$, and $|3\rangle$ in medium 210 for two-photon excitation is shown. A target laser 230 with an output at frequency $\omega$ is to be stabilized or locked at a desired frequency $\omega_S$ with respect to one or more known frequency standards 220. Such a frequency standard 220 may be, for example, a stabilized laser with a know frequency. A device 240 represents a combination of conventional frequency mixing devices and conventional frequency shifting devices. For example, an optical parametric oscillator and an electro-optic modulator can be induced in device 240.

In operation, device 240 receives the output of the known frequency standards 220 and the target laser 230 output at frequency $\omega$ and generates three excitation frequencies $\omega_a$, $\omega_b$, and $\omega_c$ that respectively correspond to transitions $1 \rightarrow 2$, $2 \rightarrow 3$, and $1 \rightarrow 3$ in the medium 210. The absorbing medium 210 receives the output of the device 240 and outputs an optical signal 212 indicative of a phase variation in the three excitation fields at $\omega_a$, $\omega_b$, and $\omega_c$. A photodetector 250 (e.g., an avalanche photodiode) detects signal 212. An electronic device 260 is used to process the signal from the photodetector 250 to generate an error signal 252 that represents a frequency deviation of the target laser 230 from the desired frequency $\omega_S$. The error signal 252 is then used to correct the frequency deviation by coupling the error signal 252 to a control system of the laser 230, thereby stabilizing the target laser 230 at frequency $\omega_S$. Thus, the target laser 230 is phase-locked to the frequency standards 220, and hence generates a new frequency standard at $\omega_S$.

Figure 3:
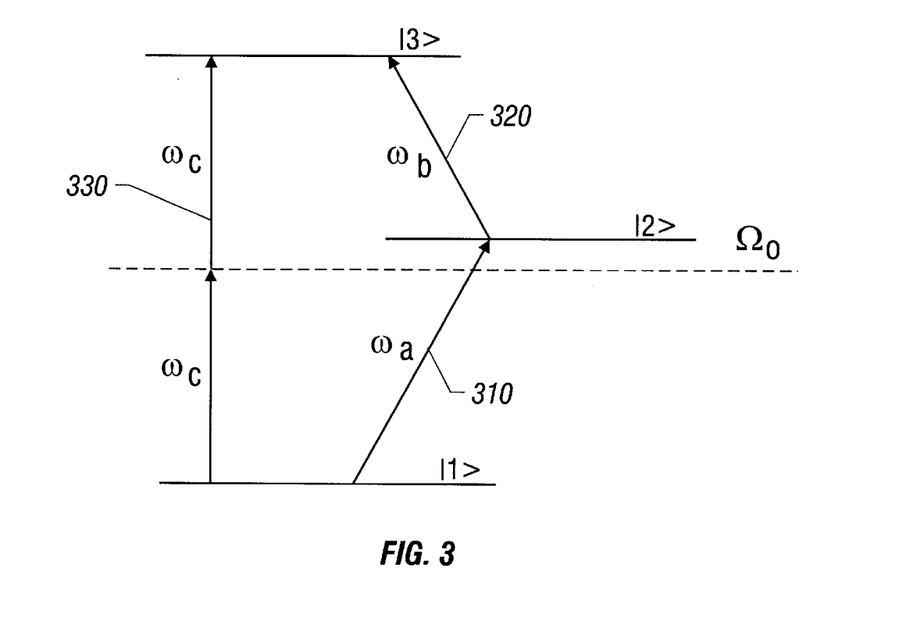
FIG. 3 is a schematic showing energy levels of a preferred 3-level medium that can be used for two-photon excitation in accordance with the present invention.

The three selected energy levels $|1\rangle$, $|2\rangle$, and $|3\rangle$ of the absorbing medium 210 for two-photon excitation are shown in FIG. 3. The frequency separations are $\omega_{12}$ for transition 310 from $1 \rightarrow 2$, $\omega_{23}$ for transition 320 from $2 \rightarrow 3$, and $\omega_{13} = \omega_{12} + \omega_{23}$ for transition 330 from $1 \rightarrow 3$. The three excitation fields at $\omega_a$, $\omega_b$, and $\omega_c$ from the device 240 are chosen to be $\omega_a \approx \omega_{12}$, $\omega_b \approx \omega_{23}$, and $\omega_c \approx \omega_{13}/2$, i.e., respectively resonant with the three transitions.

Quantum interference arises from the presence of multiple different mutually coherent paths of excitation that affect a common energy level. For the 3-level system in FIG. 3, two alternative paths are "stepwise" dipole absorption of single photons at frequencies $\omega_a \approx \omega_{12}$, $\omega_b \approx \omega_{23}$ (i.e., $|1\rangle \rightarrow |2\rangle \rightarrow |3\rangle$) and quadrupole two-photon absorption at $\omega_c \approx \omega_{13}/2$ (i.e., $|1\rangle \rightarrow |3\rangle$). The atomic population $\rho_{33}$ at the excited level $|3\rangle$ is affected by both excitation paths and can be used to monitor the quantum interference between the "stepwise" dipole excitation and the quadrupole two-photon excitation. A fixed phase relationship of the three excitation fields at $\omega_a$, $\omega_b$, and $\omega_c$ is desirable to maintain mutual coherence. Deviations from the "triangle equality" of $\omega_a + \omega_b = 2\omega_c$ result in modulation of the excited state population $\rho_{33}$. This modulation is a sinusoidal at a frequency $\Delta\omega = (\omega_a + \omega_b - 2\omega_c)$ if the medium is not saturated:

$$\rho_{33}(t) \sim 1 + \nu \cos(\Delta\omega \cdot t + \phi)) \quad (1)$$

wherein $\nu$ is visibility and phase $\phi$ is determined by phases $\phi_a$, $\phi_b$, $\phi_c$ of the three excitation fields:

$$\phi = \phi_a + \phi_b - 2\phi_c. \quad (2)$$

Therefore, the 3-level medium 210 effectively acts as a nonlinear mixing element that compares $\omega_a + \omega_b$ to $2\omega_c$.

The modulation due to quantum interference represented by Equation (1) can be observed by measuring, for example, fluorescence intensity by spontaneous decay from $|3\rangle$ to $|2\rangle$. A change in any of the three frequencies $\omega_a$, $\omega_b$, and $\omega_c$ due to a frequency drift in the target laser 230 will cause a change in the fluorescence intensity. This change can be used to generate the error signal 252 to compensate for frequency drift, thus "locking" the target laser 230 at frequency $\omega_S$.

Each of the excitation frequencies $\omega_a$, $\omega_b$, and $\omega_c$ is in general a linear combination of the known frequency standards 220 and frequency $\omega$ produced by the target laser 230. The structure of such linear combination is determined by the specific configuration and operation of frequency shifting and frequency mixing of device 240. The electronic device 260 can be configured to extract a frequency relation between the target laser 230 and the frequency standards 220 from the optical signal 212 emitted by medium 210 based on the linear relationships between the excitation frequencies ($\omega_a$, $\omega_b$, $\omega_c$) and the frequency of the target laser 230 and frequency standards 220. The electronic device 260 uses this frequency relation to generate the error signal 252.

The inventors have recognized that any nonlinear wave mixing and frequency shifting or a combination thereof can be implemented in device 240 to generate desired excitation frequencies $\omega_a$, $\omega_b$, and $\omega_c$ for selected energy levels $|1\rangle$, $|2\rangle$, and $|3\rangle$ of the medium 210. Conventional nonlinear wave mixing in nonlinear optical materials, such as sum and difference frequency generation and harmonic conversion (e.g., second and third harmonic generations) can be used. See, for example, Quantum Electronics by Amnon Yariv, Wiley 3rd Edition, Chapter 16. The inventors have also recognized that electro-optic light modulation and acousto-optic modulation can be used for frequency shifting. Details of such techniques can be found, for example, in Quantum Electronics by Amnon Yariv, chapter 14. The disclosure of chapters 14 and 16 in Quantum Electronics by Amnon Yariv is incorporated herein by reference.

A beneficial feature of the preferred system 200 is large frequency demodulation. If $\omega_c$ is smaller than $\omega_a$ by $\Omega_0$, as indicated in FIG. 3, the two-photon process corresponds to demodulation of sidebands at $\omega_a = \omega_c + \Omega_0$ and $\omega_b = \omega_c - \Omega_0$ with respect to a "local oscillator" at $\omega_c$. This demodulation can be very large (from 10's THz to about 100's THz), depending on the selected medium 210 and its energy levels. For example, $\Omega_0/2\pi$ is about 12.5 THz for transitions $6S_{1/2} \rightarrow 6P_{3/2} \rightarrow 6D_{5/2}$ in cesium atoms. For Li atoms with transitions $2S_{1/2} \rightarrow 4P_{3/2} \rightarrow 8S_{1/2}\Omega_0/2\pi$ is about 250 THz. With this medium, three lasers with corresponding wavelengths of 274 nm, 480 nm, and 1954 nm can be mixed and a beatnote thereof can be directly observable in a single measurement. In comparison, conventional systems can only produce demodulation up to about 500 GHz.

The inventors have recognized that there are many sets of 3-level transitions for two-photon excitation in numerous atomic and molecular species that can be used as the medium 210 in accordance with the invention to generate a large number of frequency standards, from UV to the near IR spectrum. In particular, a frequency standard can be generated at any location in the spectral range from about 200 nm to about 2000 nm according to the invention. This is significant in both scientific research and commercial applications since only a few frequency standards have been established so far in the infrared range for fiber optics from 1.3 $\mu$m to 1.6 $\mu$m. The inventors have investigated alkali atoms and relevant transitions that are suitable for the present invention based on atomic energy levels published by C. E. Moore in "Atomic Energy Levels, Vols. I, II, and III" and on data published on the Internet by NIST at http://aeldata.phy.nist.gov./archive/el.html. The inventors found about 6800 ladder transitions in Li, Na, K, Rb, Cs that are possible "triangles" of the form $\omega_{13}=\omega_{12}+\omega_{23}$, each of which may be used as a different nonlinear mixer medium 210 in system 200 for quantum interference, phase sensitive detection, and generation of frequency standards.

Figure 4A:
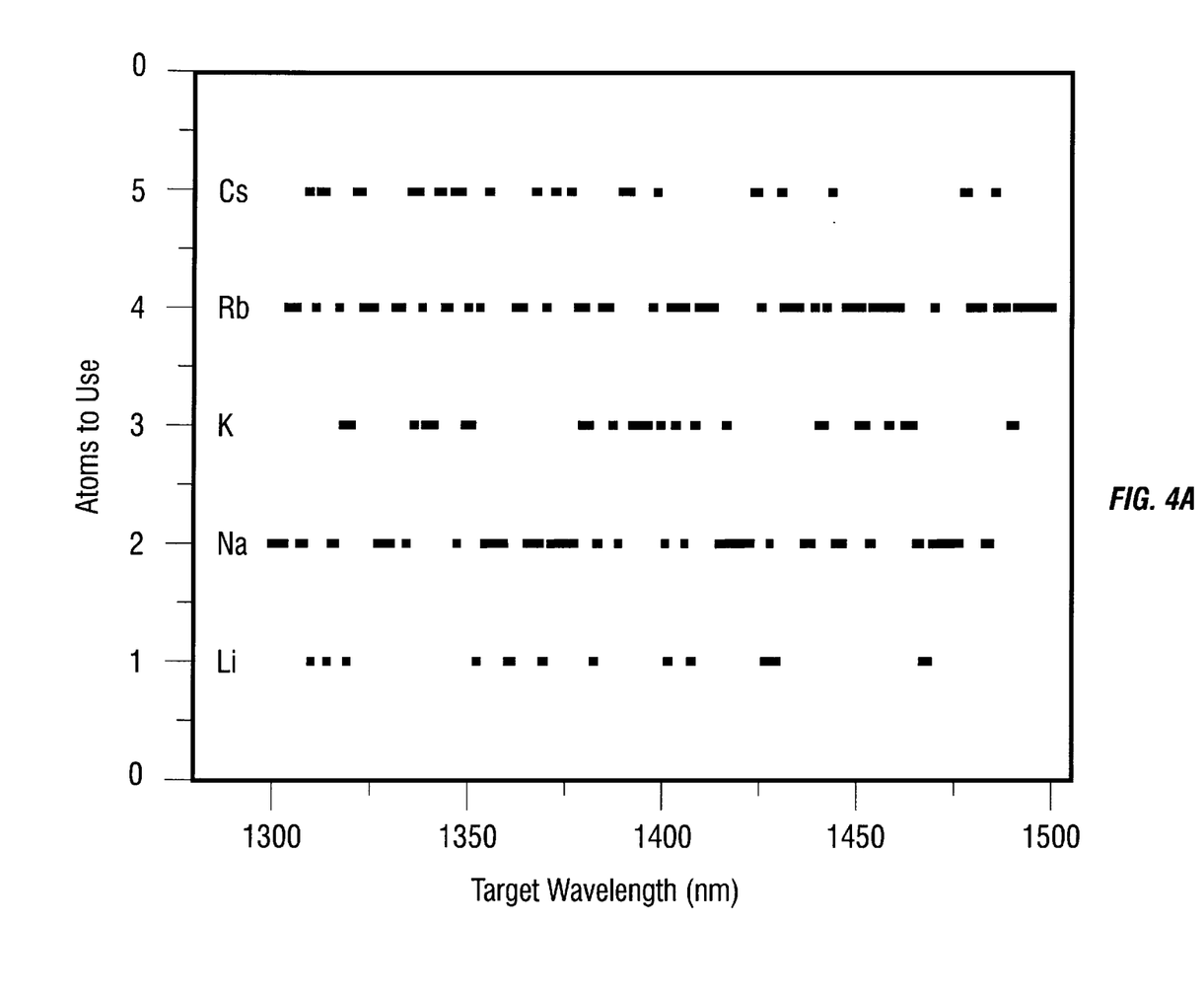
FIG. 4A is a chart showing frequency coverage and density of some of the frequency standards that can be generated with alkali atoms in accordance with present invention.

FIG. 4A shows frequency coverage and wavelength spacing or "coverage density" for frequency standards that can be generated within a spectrum particularly well suited for the present fiber optics using ladder transitions in alkali atoms in accordance with the invention.

Figure 4B:
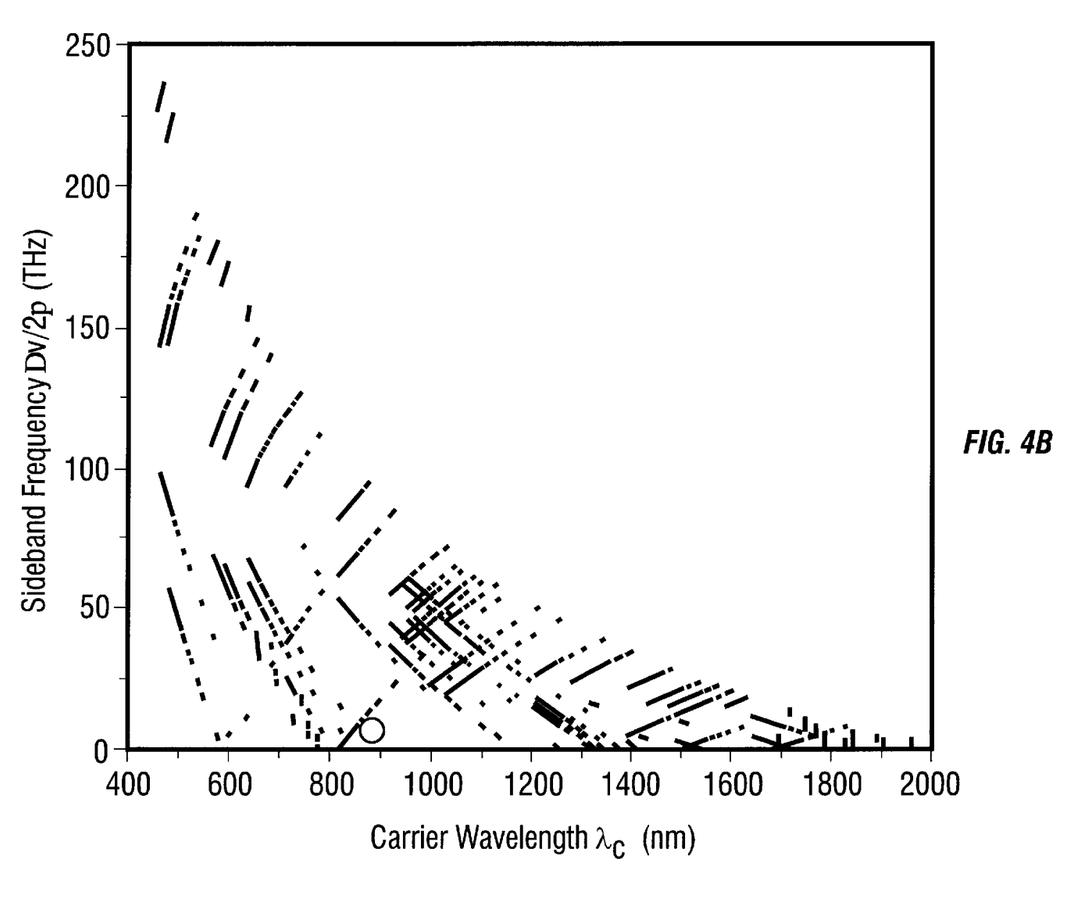
FIG. 4B is a chart showing nonlinear mixer characteristics for the sideband to carrier separation as a function of carrier wavelength available from ladder two-photon transitions in alkali atoms.

FIG. 4B shows nonlinear mixer characteristics of the medium 210 for the sideband to carrier separation as a function of carrier wavelength available from the selected 6800 sets of ladder transitions in alkali atoms. The circled point indicates a result measured in testing a prototype system using $6S_{1/2} \rightarrow 6P_{3/2} \rightarrow 6D_{5/2}$ transitions in cesium.

This data base of 3-level transitions suitable for the present invention will expand significantly if 3-level transitions other than ladder transitions are considered, including V-shape and Λ-shape two-photon transitions. Many transitions in other atoms and molecules in addition to alkalis can be further included to expand this data base. In addition, energy levels in selected semiconductor materials and other solid-state materials suitable for multiphoton excitation also may be used in accordance with the present invention. The inventors contemplate that materials in gas, liquid, and solid state phases can be used in practicing the present invention.

In view of the large database for two-photon transitions, one skilled in the art can appreciate the flexibility and the capability in spectral coverage of the preferred embodiment of the invention. This allows the invention to not only establish new frequency standards in a spectral range that is technically difficult to accomplish with conventional techniques, but also to add additional frequency standards in a spectrum covered by existing frequency standards to provide marks for calibration and cross references.

Another aspect of the invention is a configuration process and protocol for choosing appropriate existing frequency standards 220 with a set of standards $\Omega_r=\{\omega_{r1}, \omega_{r2}, \ldots\}$, components of the device 240 for frequency mixing and/or shifting, and a medium 210 with suitable transitions to measure the absolute value of a target frequency $\omega_t$. The end result of this process is an implementation scheme and strategy to generate a new frequency standard at $\omega_t$. Some aspects of the protocol are described below.

1. Construct a new set of frequencies, $\Omega^1=\{\omega'_1, \omega'_2, \ldots\}$, from $\Omega^0=\omega_t \cup \Omega_r$, by nonlinear wave mixing with the device 240. A component in the new set $\Omega^1$ can be a linear combination of any two components from $\Omega^0=\omega_t \cup \Omega_r$, i.e., in the form of $\omega_i \pm \omega_j$.

2. This nonlinear mixing process may be repeated to k stages to generate a final set of frequencies $\Omega^k=\{\omega^k_1, \omega^k_2, \ldots\}$, with the number of frequencies growing exponentially in k. For example, with two reference frequencies 220 and one target laser 230, k=2 stages of nonlinear mixing can produce about 100 distinct frequencies.

3. Select three excitation frequencies from all possible triplets, $\{\omega_a, \omega_b, \omega_c\}$, from the total set $\Omega=\Omega^0 \cup \Omega^1 \cup \ldots \cup \Omega^k$. Preferably, at least one of the three selected frequencies is traceable back to the target frequency $\omega_t$ and at least another one is traceable to the frequency standards 220.

4. Keep only those triplets from $\{\omega_a, \omega_b, \omega_c\}$ that satisfy:

$$\omega_a+\omega_b-2\omega_c<\Delta_{max} \tag{3}$$

wherein $\Delta_{max}$ is the maximum frequency offset that can be either directly detected or compensated via frequency shifting (e.g., by electro-optic or acousto-optic modulation). Typically, the maximum frequency offset $\Delta_{max}$ is less than about 500 GHz.

5. The triplets from step 4 are cross-referenced to a database of two-photon transitions with a search algorithm that optimizes for user specified criteria. For example, a criterion of minimizing the sum of the detunings, $$\Sigma=|\omega_a-\omega_{12}|+|\omega_b-\omega_{23}|+|\omega_c-\tfrac{1}{2}\omega_{23}|, \tag{4}$$

can be used in a search. One result of the optimization process is to identify the best possible medium from the database, within the limits of the search, for implementing the measurement. Another goal of the optimization process is to specify the elements of the device 240, including (but not limited to) one or more nonlinear optical media (e.g., for frequency sum and difference and harmonic generations), and/or a frequency shifting device.

The above configuration process and protocol can be complex, partially due to many possibilities in the two-photon transition database and in existing frequency standards. Thus for convenience, the inventors developed a computer-aided search process to optimize the searching. A number of control parameters can be implemented in the search process to find optimized measurement strategies for any target wavelength in a spectrum of interest for a given set of frequency standards. The following examples illustrate some factors that may be included in the search program as control parameters: (1) number of lasers involved; (2) specific type of absorbing medium (e.g., atoms and molecules); (3) type of atomic/molecular transitions (e.g., ladder, V- or Λ-shape); (4) number of nonlinear crystals; (5) number of nonlinear mixing stages; (6) power requirement for each selected laser.

Figure 5:
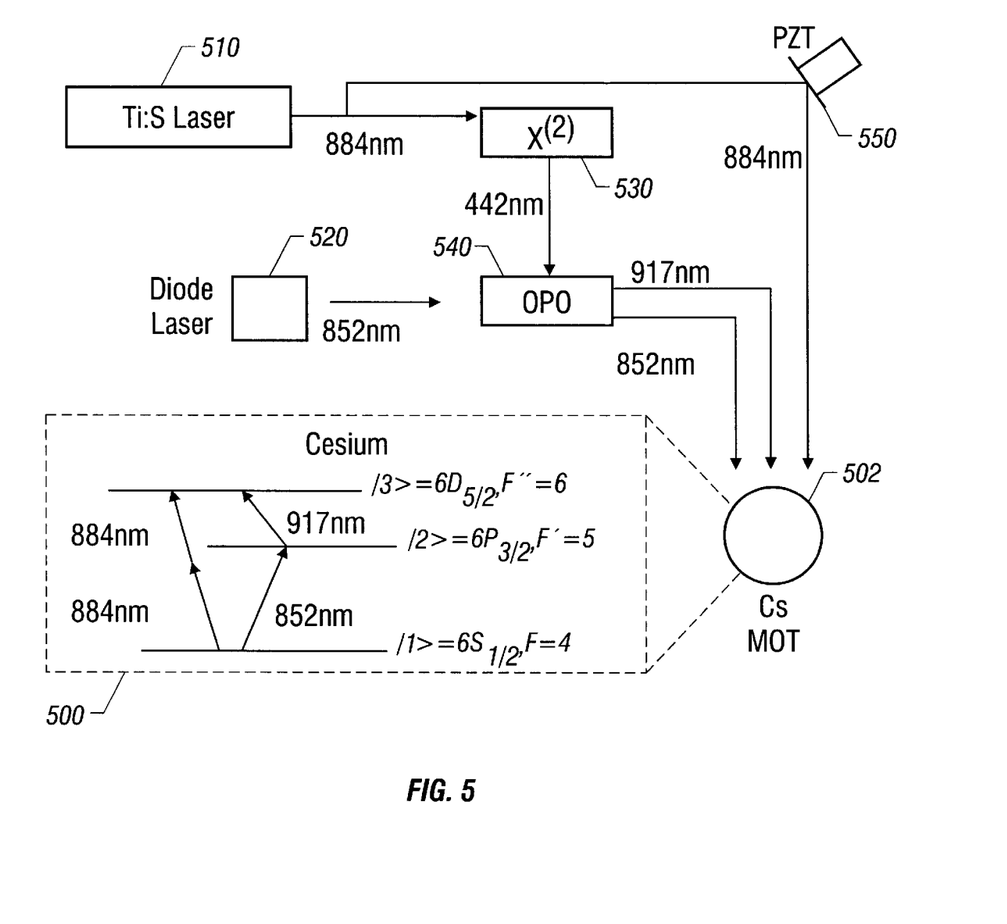
FIG. 5 is a block diagram illustrating a prototype system of the frequency standard generator of FIG. 2. The insert shows the energy levels in $^{133}$Cs used in one experiment.

A prototype system was built and tested in an initial proof-of-principle experiment using cesium atoms. FIG. 5 shows the prototype system 500. A magneto-optical trap (MOT) 502 is used to confine laser-cooled cesium atoms. Cold atoms are preferred since they have Doppler-free narrow linewidths. Three frequency-stabilized laser beams at $\lambda_a \approx 852$ nm, $\lambda_b \approx 917$ nm, and $\lambda_c \approx 884$ nm are used to excite the $6S_{1/2}(F=4) \rightarrow 6P_{3/2}(F=5) \rightarrow 6D_{5/2}(F=6)$ transition in atomic Cesium.

The field at $\lambda_c \approx 884$ nm originates from a tunable Ti:Sapphire laser 510 that is externally locked to a reference cavity (not shown). The reference cavity is in turn locked to a Doppler-free two-photon transition $6S_{1/2}(F=4) \rightarrow 6D_{5/2}(F=6)$ of cesium vapors in an auxiliary cell. A diode laser 520 stabilized at $6S_{1/2}(F=4) \rightarrow 6P_{3/2}(F=5)$ with an external grating produces the field at 852 nm. A frequency doubler 530 converts part of the 884 nm laser beam into a field at 442 nm. The field at 917 nm is derived via nonlinear wave mixing of the 853 nm field from the diode laser 520 and the 442 nm field from the frequency doubler 530 in an optical parametric oscillator (OPO) 540.

Measurements were conducted continuously in two alternating stages that were switched at a rate of 4 KHz. In a first stage, cesium atoms are maintained in the MOT 502. In a second stage, the trapping beams of the MOT 502 are chopped off and the cesium atoms are illuminated with three laser fields at 852 nm (0.5 nW), 917 nm (0.5 nW), and 884 nm (5 mW), respectively. The population $\rho_{33}$ at excited state $6D_{5/2}(F=6)$ is monitored by observing the fluorescent decay from $6D_{5/2}(F=6)$ to $6P_{3/2}(F=5)$ at 917 nm using an avalanche photodiode.

Since all three laser fields are stabilized, a moving mirror 550 mounted on a PZT transducer is used to change the optical path length of the field at 884 nm. A sawtooth ramp signal at a modulation frequency $\omega_m$ is applied to the PZT, thus moving the mirror 550. During the long linear segment of the ramp, the phase $\phi_c$ of the field 884 nm is $\phi_c \approx \omega_m t$ with $\omega_m/2\pi \sim 10$–20 Hz. Referring to Equations (1) and (2), $|\phi(t)| \approx 2\omega_m t$ since the frequency difference $\Delta=0$ by virtue of the parametric process in the system 500. Therefore, the excited state population $\rho_{33}$ should be modulated at $2\omega_m$ due to quantum interference. The measured data confirms this as shown in FIG. 6.

Figure 6:
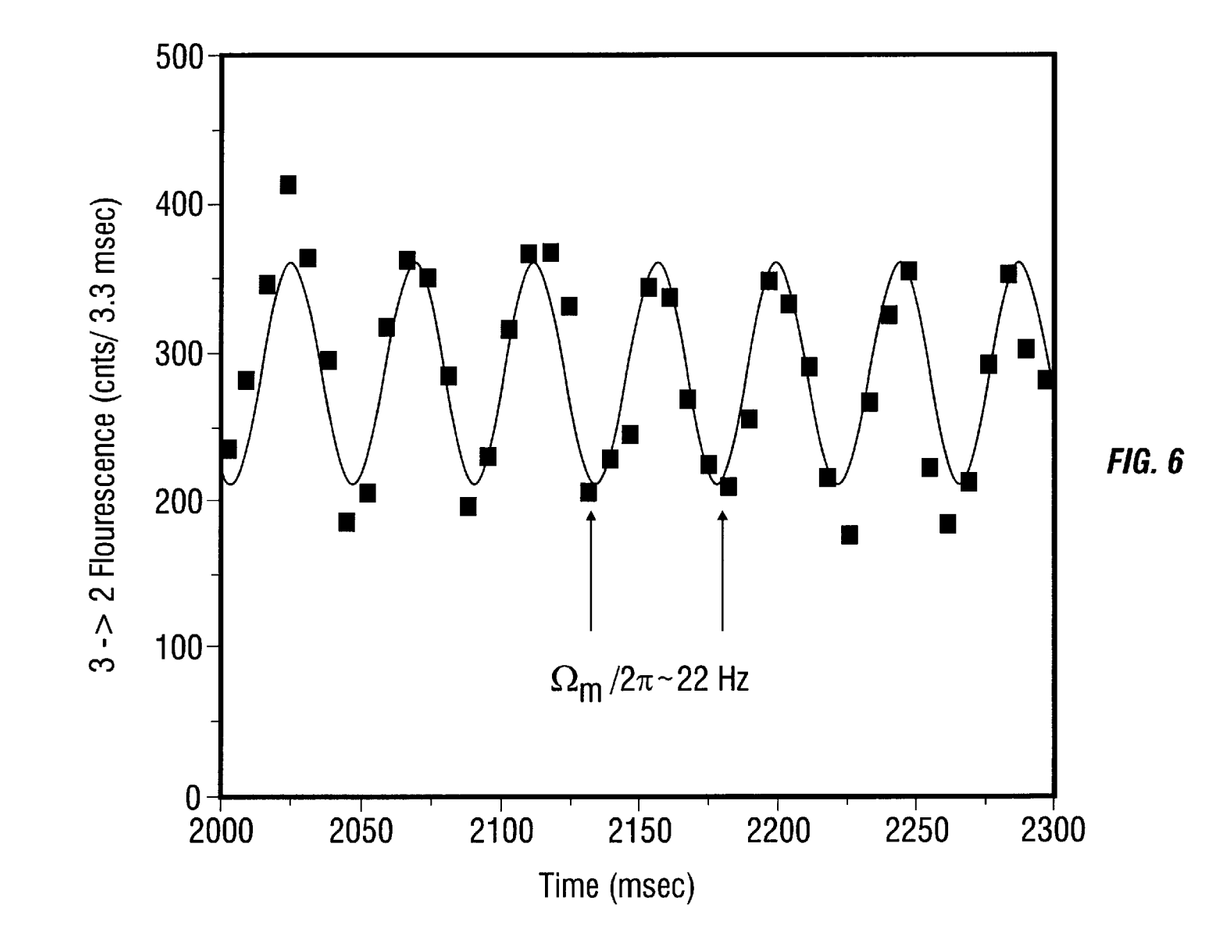
FIG. 6 is a chart showing the measured fluorescence signal at 917 nm as a function of time in testing the prototype system of FIG. 5.

The data in FIG. 6 also represents demodulation of fields over an optical interval of $(\omega_a - \omega_b)/2\pi \approx 25$ THZ. From another point of view, the field at $\omega_c$ serves as the local oscillator (carrier frequency) and $\omega_a$ and $\omega_b$ are its sidebands. Hence, the modulation of FIG. 6 is the beatnote between the three laser fields at $\omega_a$, $\omega_b$, and $\omega_c$. The power of the invention is highlighted by the realization that the sideband—carrier frequency separation is equal to $\omega_a - \omega_c = \omega - \omega_b \approx 12.5$ THz which should be compared with conventional mixers for which the corresponding separation is usually less than 10 GHz.

The phase change in prototype system 500 is purposely introduced since lasers 510 and 520 are stabilized relative to atomic transitions. A frequency drift in one of the lasers 510 and 530 can cause a phase change, thus producing a modulation in the fluorescence intensity at 917 nm. By adding an electronic circuit for generation of an error signal and a stabilization system for the unstable laser, system 500 can be used as a frequency standard generator as shown in FIG. 2. The MOT 502 would correspond to the medium 210 of FIG. 2. The frequency doubler 530 and the OPO 540 in FIG. 5 would correspond to the device 240 for nonlinear frequency mixing.

The inventors further discovered that the invention can be used to detect quantum fluctuations of quadrature squeezing at a frequency separation several magnitude larger than conventional homodyne detection using photodetectors. For a triplet of frequencies ($\omega_p$, $\omega_s$, $\omega_i$) for the pump, signal and idler fields (with $\omega_p = \omega_s + \omega_i$), nonclassical correlations manifest at frequency separation $\Delta\omega = |\omega_s - \omega_i|$, which could be very large and comparable to the optical frequency, $\Delta\omega \leq \omega_p$. Conventional homodyne detection usually is limited to signals with frequency offset $\Delta\omega/\omega_p \ll 1$ since even the best photodetectors usually have a frequency cutoff at about 10 GHz, corresponding to $\Delta\omega/\omega_p \leq 10^{-5}$ for $\omega_p$ in the visible region.

In accordance with the present invention, photodetectors in the conventional homodyne detection systems can be replaced by atoms or molecules with energy levels for multiphoton excitation. Quantum interference at a common energy level of multiple excitation paths can be used to measure quantum fluctuations for the signal and idler fields at $\omega_p/2 \pm \Delta\omega/2$. The prototype system in FIG. 5 with cesium atoms can be used to measure $\Delta\omega/2\pi = 25$ THz with normalized offset $\Delta\omega/\omega_p \approx 0.07$. This offset is three magnitudes larger than that which can be achieved by homodyne detection. One skilled in the art should appreciate that the large database of 3-level two-photon transitions described above can be used to cover a wide spectral range for this novel detection technique.

Although the invention has been described in detail with reference to a preferred embodiment, one of ordinary skill in the art to which this invention pertains will appreciate that various modifications and enhancements may be made without departing from the scope and spirit of the invention, which are further defined by the following claims.

What is claimed is:

1. An opto-electronic system, comprising:
   an optical medium having a plurality of energy levels susceptible to multiphoton excitation through a plurality of excitation paths affecting at least one common energy level that is accessed by said excitation paths;
   a light source disposed relative to said optical medium, operable to generate at least three coherent light beams at different frequencies to which said optical medium is responsive, said light beams interacting with said optical medium by said multiphoton excitation to cause quantum interference associated with said common energy level and having a phase relation with respect to phase values of said light beams, whereby said optical medium emits an optical signal having information about said common energy level and being indicative of said phase relation; and
   a photodetector, responsive to said optical signal and disposed relative to said optical medium, for receiving said optical signal and generating a control signal representative of said optical signal.

2. A system as in claim 1, wherein said optical signal is a fluorescent signal caused by a spontaneous decay associated with said common energy level.

3. A system as in claim 1, wherein said optical medium includes atoms of an alkali element.

4. A system as in claim 1, wherein said energy levels in said optical medium include three selected energy levels with a low level, a middle level, and a high level, said three selected energy levels allowing two-photon excitation by a stepwise dipole excitation path which includes a first dipole excitation at a first transition from said low level to said middle level and a second dipole excitation at a second transition from said middle level to said high level, and by a quadrupole two-photon excitation path at a third transition from said low level directly to said high level.

5. A system as in claim 4, wherein said light beams generated by said light source comprise a first light beam with a first frequency in resonance with said first transition, a second light beam with a second frequency in resonance with said second transition, and a third light beams with a third frequency in resonance with said third transition, and said common energy level is said high level.

6. A system as in claim 1, wherein said light source comprises a plurality of lasers, each operating at a different frequency.

7. A system as in claim 6, wherein said light source further comprises an optical nonlinear device, operating to generate at least one light beam having a frequency different from said lasers.

8. A system as in claim 7, wherein said optical nonlinear device generates a harmonic light wave of a light beam from one of said lasers.

9. A system as in claim 6, wherein said light source further comprises an optical parametric oscillator, operating to generate a new coherent light beam having a frequency different from said lasers.

10. A system as in claim 6, wherein said light source further comprises a frequency-shifting device.

11. A system as in claim 10, wherein said frequency-shifting device has at least one of an acousto-optic light modulator and an electro-optic light modulator.

12. A system for measuring a target frequency of a target laser, comprising:

a plurality of stabilized lasers, each producing a different and known frequency standard;

a frequency generating device, operating to receive optical beams from said target laser and said stabilized lasers and produce a pre-determined number of excitation optical beams at different pre-determined excitation frequencies related to said target laser and stabilized lasers, at least one of said excitation frequencies having a frequency relationship with said target frequency;

a light-responsive medium operable to interact with said excitation optical beams, having a plurality of energy levels susceptible to multiphoton excitation by a plurality of excitation paths affecting at least one common energy level that is accessed by said excitation paths, said excitation optical beams causing said medium to generate an optical signal indicative of a frequency separation by said target frequency relative to said frequency standards by quantum interference associated with said common energy level; and a photodetector, responsive to said optical signal and disposed relative to said medium, for receiving said optical signal and generating an electrical signal indicative of said frequency separation.

13. A system as in claim 12, further comprising an electronic device connected to said photodetector and receiving said electrical signal therefrom, said electronic device operable to extract information of said frequency separation partially based on a relationship between said excitation frequencies and frequencies of said target laser and stabilized lasers, thereby determining said target frequency with respect to said frequency standards.

14. A system as in claim 13, further comprising:

a frequency stabilization device, connected to said target laser and said electronic device, for controlling operation of said target laser in response to said extracted information of said frequency separation so that said target frequency is locked with respect to a predetermined lock frequency, thereby stabilizing said target laser with respect to said frequency standards.

15. A system as in claim 12, wherein said optical signal is a fluorescent signal caused by a spontaneous decay associated with said common energy level.

16. A system as in claim 12, wherein said light-responsive medium includes atoms of an alkali element.

17. A system as in claim 12, wherein said energy levels in said light-responsive medium include three selected energy levels with a low level, a middle level, and a high level, said three selected energy levels allowing two-photon excitation by a stepwise dipole excitation path which includes a first dipole excitation at a first transition from said low level to said middle level and a second dipole excitation at a second transition from said middle level to said high level, and by a quadrupole two-photon excitation path at a third transition from said low level directly to said high level.

18. A system as in claim 17, wherein said frequency generating device generates three said excitation frequencies with a first excitation frequency in resonance with said first transition, a second excitation frequency in resonance with said second transition, and a third excitation frequency in resonance with said third transition, and said common energy level is said high level.

19. A system as in claim 12, wherein said frequency generating device comprises an optical nonlinear medium, operating to generate at least one light beam having a frequency different from said target and stabilized lasers.

20. A system as in claim 19, wherein said optical nonlinear medium generates a harmonic light wave of a light beam from one of said target and stabilized lasers.

21. A system as in claim 12, wherein said frequency generating device comprises an optical parametric oscillator, operating to generate a new coherent light beam having a frequency different from said target and stabilized lasers.

22. A system as in claim 12, wherein said frequency generating device comprises a frequency-shifting device.

23. A system as in claim 22, wherein said frequency-shifting device has at least one of an acousto-optic light modulator and an electro-optic light modulator.

24. A nonlinear optical signal mixer for mixing a plurality of coherent optical signals at different frequencies, comprising:

a signal mixing medium, having a plurality of energy levels forming multiple transitions and susceptible to multiphoton excitation by a plurality of excitation paths affecting at least one common energy level that is accessed by said excitation paths;

a frequency generating device, operating to receive said optical signals and produce a pre-determined number of excitation optical beams at different pre-determined excitation frequencies that are respectively resonant with said transitions in said signal mixing medium through single-photon absorption or multiphoton absorption, said excitation beams interacting with said medium by said multiphoton excitation to cause quantum interference associated with said common energy level, whereby said optical medium emits an optical modulation signal relating to said common energy level and indicative of a beatnote of said excitation lasers; and a photodetector, responsive to said optical modulation signal and disposed relative to said signal mixing medium, for receiving said optical modulation signal.

25. A method of achieving quantum interference by multiphoton excitation, comprising:

providing an optical medium having a plurality of energy levels susceptible to multiphoton excitation through a plurality of excitation paths affecting at least one common energy level that is accessed by said excitation paths;

illuminating said optical medium with at least three coherent light beams at different frequencies to which said optical medium is responsive to cause said multiphoton excitation and to effect quantum interference associated with said common energy level and having a phase relation with respect to phase values of said light beams, whereby said optical medium emits an optical signal having information about said common energy level and being indicative of said phase relation; and receiving said optical signal and generating a control signal representative of said optical signal.

26. A method of generating quantum interference, comprising:

providing an optical medium, having a plurality of energy levels susceptible to multiphoton excitation by a plurality of excitation paths affecting at least one common energy level that is accessed by said excitation paths;

illuminating said optical medium with a first plurality of coherent light beams at first different frequencies to which said optical medium is responsive, to effect a first multiphoton excitation from a low energy level to a high energy level through a first excitation path;

illuminating said optical medium with a second plurality of coherent light beams at different frequencies to which said optical medium is responsive, to effect a second multiphoton excitation from said low energy level to said high energy level through a second excitation path that is different from said first path, whereby said first multiphoton excitation quantum-mechanically interferes with said second multiphoton excitation at said high energy level; and detecting an optical signal associated with said high energy level to monitor an effect indicative of said interference at said high energy level.

27. A method as in claim 26, wherein said optical signal is a fluorescent decay signal from said high energy level to one of said energy levels, representing a population modulation at said high energy level.

28. A method of configuring a system for measuring absolute frequency of a target laser using a plurality of frequency standards through quantum interference of multiphoton excitation, comprising:

constructing a new set of optical beams having first frequencies by mixing said target frequency and frequency standards with at least one nonlinear optical medium, said first frequencies having first relations with said target frequency and frequency standards;

selecting a plurality of first excitation frequency groups from a selection pool including said first frequencies, said target frequency, and said frequency standards, each of said excitation frequency groups having a pre-determined number of excitation frequencies suitable to effect said quantum interference with at least one excitation frequency relating to said target frequency;

selecting a plurality of second excitation frequency groups from said first groups according to a selection criterion;

providing a transition database having a plurality of transition sets from a plurality of materials with each transition set suitable for said multiphoton excitation;

correlating said second excitation frequency groups with said transition sets in said database according to a correlation condition; and choosing an optimized excitation frequency group from said second excitation frequency groups and a corresponding transition set according to an optimization criterion.

29. A method as in claim 28, wherein said constructing of said first frequencies includes use of a device operable to cause frequency shift of an optical beam.

30. A method as in claim 28, wherein said selection criterion includes a relation of said excitation frequencies in each of said first groups.

31. A method as in claim 28, wherein at least one of said first frequencies is generated from a plurality of cascaded nonlinear mixing stages.

32. A method as in claim 28, wherein said optimization criterion includes a frequency detuning condition between said optimized excitation frequency group and said corresponding transition set.

* * * * *